US008410414B2

(12) United States Patent
Wu et al.

(10) Patent No.: US 8,410,414 B2
(45) Date of Patent: Apr. 2, 2013

(54) FLUORESCENCE MICROSCOPY IMAGING SYSTEM

(75) Inventors: Ping Jung Wu, Changhua County (TW); Kuen Chiuan Cheng, Kaohsiung (TW); Hsing Cheng Yu, Hsinchu County (TW); Jau Jiu Ju, Hsinchu (TW); Chun Chieh Huang, Hsinchu (TW); Yuan Chin Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 12/872,910

(22) Filed: Aug. 31, 2010

(65) Prior Publication Data
US 2011/0284720 A1 Nov. 24, 2011

(30) Foreign Application Priority Data

May 19, 2010 (TW) .............................. 99116015 A (51) Int. Cl.
*G02B 7/04* (2006.01)
*G01J 1/58* (2006.01)
(52) U.S. Cl. .................................................. 250/201.3
(58) Field of Classification Search ............... 250/201.2, 250/201.3, 201.4, 458.1; 359/368, 381, 383
See application file for complete search history.

(56) References Cited

U.S. PATENT DOCUMENTS

| | | | |
|---|---|---|---|
| 6,356,088 B1 | 3/2002 | Simon et al. | |
| 7,158,226 B2 | 1/2007 | Gfrorer et al. | |
| 7,232,980 B2 * | 6/2007 | Oshiro et al. | 250/201.3 |
| 7,466,408 B2 | 12/2008 | Tanaami | |
| 7,612,316 B2 * | 11/2009 | Karasawa et al. | 250/201.4 |
| 7,639,420 B2 | 12/2009 | Yamamoto | |

OTHER PUBLICATIONS

Yoshinori Iketaki et al., Construction of super-resolution microscope based on cw laser light source, Review of Scientific Instruments, 2006, vol. 77, American Institute of Physics.
Takeo Tanaami et al., High-speed 1-frame/ms scanning confocal microscope with a microlens and nipkow disks, Applied Optics, Aug. 1, 2002, pp. 4704-4708, vol. 41, No. 22, Optical Society of America.
Takashi Hiraga et al., Nanometer scale marker for fluorescent microscopy, Review of Scientific Instruments, 2005, vol. 76, American Institute of Physics.

* cited by examiner

*Primary Examiner* — Kevin Pyo
(74) *Attorney, Agent, or Firm* — Morris Manning & Martin LLP; Tim Tingkang Xia, Esq.

(57) ABSTRACT

A fluorescence microscopy imaging system is used for detecting a fluorescence signal of a sample, and includes a module for detecting fluorescence and a module for focusing control. The module for detecting fluorescence includes a fluorescence excitation light source generator (FELSG) and a fluorescence detector. The FELSG is capable of generating an excitation light beam having a first wavelength to excite the sample to emit fluorescence. The fluorescence detector is used to read the fluorescence signal of the sample. The module for focusing control generates a servo light beam having a second wavelength. A servo light beam reflecting film disposed on an observation plane is used to reflect the servo light beam. A return beam signal is analyzed using a focusing detection method. An actuator is used to move the objective for focusing, so as to enable the fluorescence excitation light beam to excite the sample to emit fluorescence.

16 Claims, 10 Drawing Sheets

FLUORESCENCE MICROSCOPY IMAGING SYSTEM

CROSS-REFERENCE TO RELATED APPLICATIONS

This non-provisional application claims priority under 35 U.S.C. §119(a) on Patent Application No(s). 099116015 filed in Taiwan, R.O.C. on May 19, 2010, the entire contents of which are hereby incorporated by reference.

BACKGROUND

1. Technical Field

The present invention relates to a fluorescence microscopy imaging system, and more particularly to a fluorescence microscopy imaging system having a focusing servo function.

2. Related Art

An early microscope technology is an optical microscope that uses visible light to observe a target; however, the magnifying power of the optical microscope is limited due to wavelengths of visible light. Currently, a fluorescence microscope combining a laser light source with a fluorescence technology is used in further combination with computer image analysis, so as to further observe detailed internal structures of a tissue; while through a confocal microscope, z-axis control can be further utilized to obtain a high-resolution optical section, thereby achieving tomography scanning of cells. In issued U.S. Pat. No. 7,639,420, a fluorescence microscope is disclosed, but the fluorescence microscope has a large volume and is not convenient to carry.

In issued U.S. Pat. No. 6,356,088, a laser scanning microscope is disclosed, which includes three modules, namely, a laser module, a scanning module, and a microscope. The scanning module is coupled to the microscope, the laser module is coupled to the scanning module and introduces laser for scanning. The microscope is focused through an eyepiece, which is not convenient to use.

SUMMARY

Accordingly, the present invention is a fluorescence microscopy imaging system having a focusing servo function, which solves the problems in the prior art.

The fluorescence microscopy imaging system of the present invention comprises a module for detecting fluorescence and a module for focusing control.

The module for detecting fluorescence comprises a fluorescence excitation light source generator and a fluorescence detector. The fluorescence excitation light source generator is capable of generating an excitation light beam having a first wavelength to excite a sample to emit fluorescence. The excitation light beam passes through an objective and focuses on a position to be tested of the sample to excite the sample to emit fluorescence. A fluorescence signal excited from the sample is guided to the fluorescence detector, and the fluorescence detector is used to read the fluorescence signal of the sample.

The module for focusing control comprises a servo light source generator, a dichroic optical element, an actuator, a servo light beam reflecting film, and a focusing detection device. The servo light source generator is capable of generating a servo light beam having a second wavelength. The servo light beam reflecting film is disposed on an observation plane of the sample. The dichroic optical element is used for coupling the servo light path and the light path of the fluorescence detection, such that the servo light beam passes through the objective and reaches the servo light beam reflecting film. Then, a return beam signal reflected back by the servo light beam reflecting film is guided to the focusing detection device. The focusing detection device controls the actuator to move along an optical axis of the light path of fluorescence detection according to the return beam signal. The actuator is used to move and control the objective for focusing, so as to enable the fluorescence excitation light beam to excite the sample to emit fluorescence, thereby observing and recording an image of an internal structure of a tissue.

In an embodiment of the present invention, the fluorescence microscopy imaging system further comprises an optical fiber, for receiving the fluorescence signal excited after the excitation light beam focuses on the sample through the objective, and then introducing the fluorescence signal into the fluorescence detector.

In another aspect, according to an embodiment of the present invention, the servo light beam reflecting film is disposed on any one of an upper surface of a cover glass for carrying the sample, a lower surface of a cover glass for carrying the sample, and an upper surface of a slide glass for carrying the sample.

In another aspect, according to an embodiment of the present invention, the servo light beam and the fluorescence excitation light beam having different wavelengths and the dichroic optical element are used to form a dual-wavelength light path system, such that the servo light beam does not affect excitation and reception of the fluorescence signal.

In another aspect, according to an embodiment of the present invention, the fluorescence microscopy imaging system further comprises a servo control system architecture using a triaxial actuator to perform planar scanning and focusing servo function on the sample.

BRIEF DESCRIPTION OF THE DRAWINGS

The present invention will become more fully understood from the detailed description given herein below for illustration only, and thus are not limitative of the present invention, and wherein.

DETAILED DESCRIPTION OF DISCLOSED EMBODIMENTS

Figure 1:
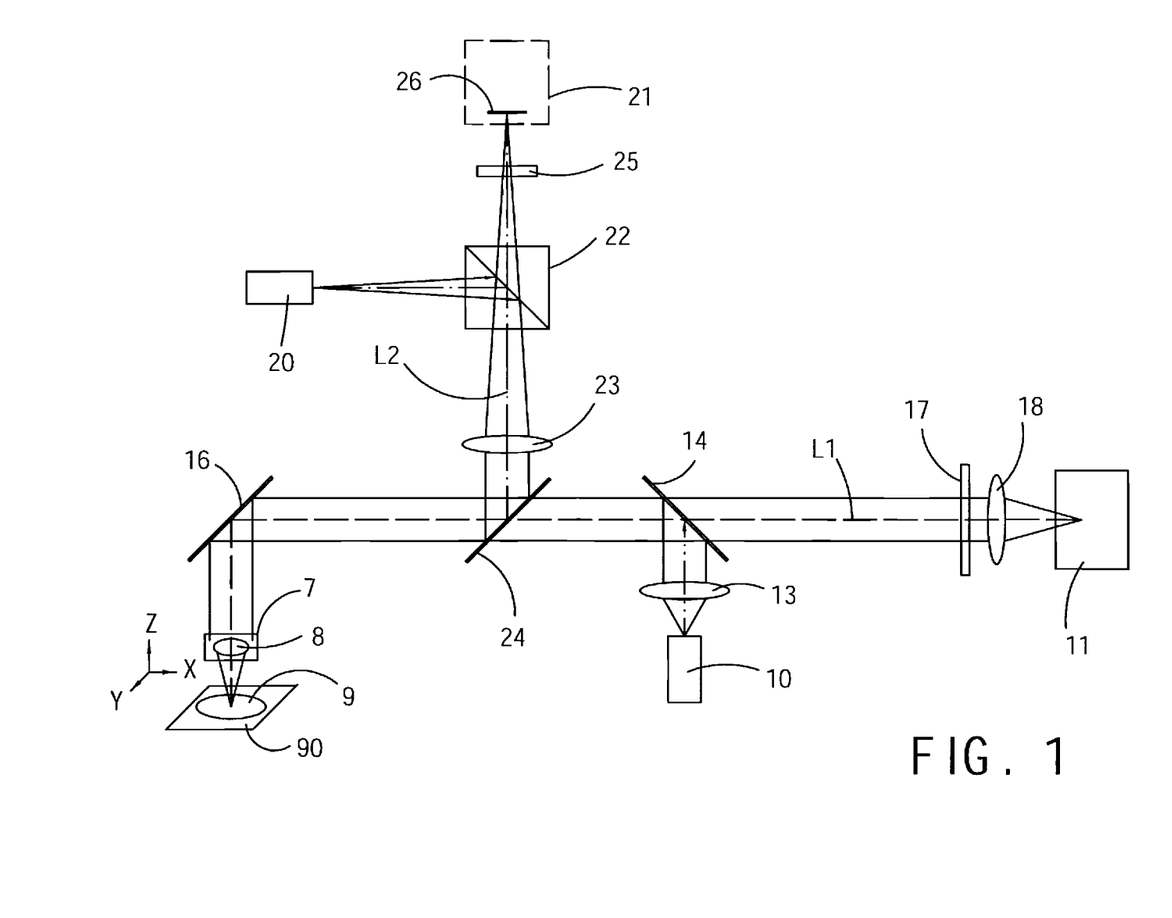
FIG. 1 shows architecture of a fluorescence microscopy imaging system according to an embodiment.

FIG. 1 shows implementation architecture of a fluorescence microscopy imaging system according to an embodiment, which includes a module for detecting fluorescence and a module for focusing control.

Figure 1A:
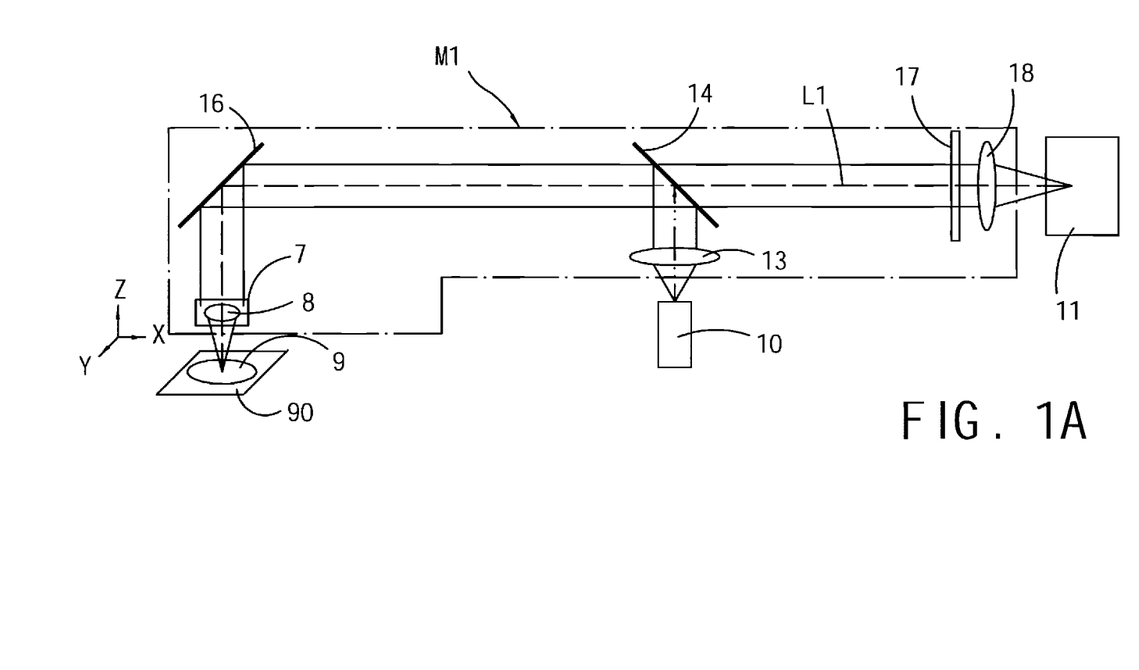
FIG. 1A is an embodiment of a module for detecting fluorescence.

Referring to FIG. 1A, the module for detecting fluorescence has a fluorescence excitation light source generator 10, an optical assemble module of fluorescence detection M1, and a fluorescence detector 11. The fluorescence excitation light source generator 10 is capable of generating an excitation light beam having a first wavelength to excite a sample 9 to emit fluorescence. The excitation light beam is guided by the optical assemble module of fluorescence detection M1 along a light path L1 to pass through an objective 8 and focused on the sample 9 so as to excite the sample 9 to emit fluorescence light, and then the excited fluorescence light of the sample 9 is guided by the optical assemble module of fluorescence detection M1 along the light path L1 to the fluorescence detector 11.

Figure 1B:
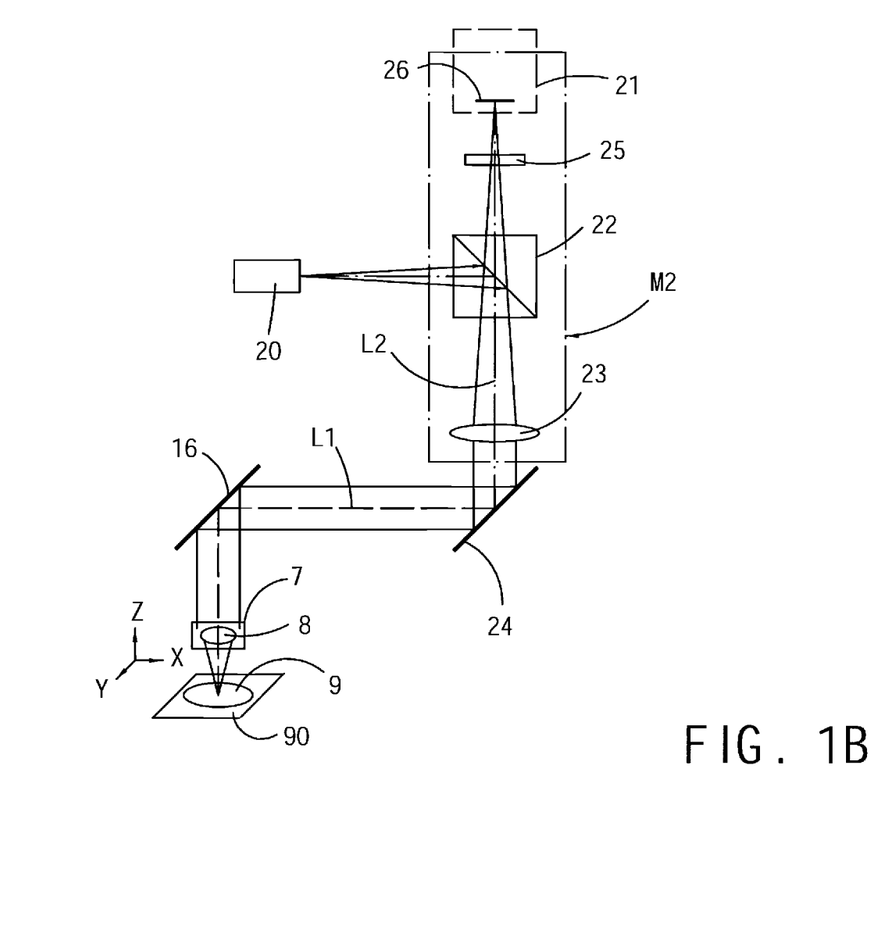
FIG. 1B is an embodiment of a module for focusing control.

Referring to FIG. 1B, the module for focusing control has a servo light source generator 20, a dichroic optical element 24, an optical assemble module of servo focus M2, an actuator 7, a servo light beam reflecting film 90, and a focusing detection device 21. The servo light source generator 20 is capable of generating a servo light beam having a second wavelength. The servo light beam reflecting film 90 is disposed on an observation plane of the sample 9. The dichroic optical element 24 is disposed at an area of intersection of the optical assemble module of servo focus M2 and the light path L1, and is used to couple the servo light beam to the light path L1, such that the servo light beam to pass through the objective 8 and reach the servo light beam reflecting film 90, and then guides a return beam reflected back from the servo light beam reflecting film 90 along a servo light path L2 to the focusing detection device 21. The focusing detection device 21 controls the actuator 7 to move along an optical axis of the light path L1 according to the return beam. The actuator 7 is used to move and thus control the objective 8 for focusing, so as to enable the fluorescence excitation light beam to focus on the sample 9 to emit excited fluorescence light.

For example, in the embodiment of the architecture of the fluorescence microscopy imaging system in FIG. 1, the module for detecting fluorescence and the module for focusing control may be integrated in the same optical bearer by modularization, so as to achieve an easy-to-carry effect.

According to an embodiment, the servo light beam is a light beam having a wavelength of 780 nm or above, and the fluorescence excitation light source generator 10 can be an optical fiber light source having a wavelength of 473 nm or a laser diode (L.D.) light source having a wavelength of 405 nm. Dichroic optical element 24 is used to separate the servo light beam from the fluorescence signal to prevent the interference of the fluorescence signal and the servo light beam.

An embodiment of the present invention further comprises a triple-wavelength light path system, in which the servo light beam is a light beam having a wavelength of 780 nm or above, and meanwhile fluorescence excitation light source generator 10 can be an optical fiber light source having a wavelength of 473 nm and a laser diode (L.D.) light source having a wavelength of 405 nm.

Figure 2:
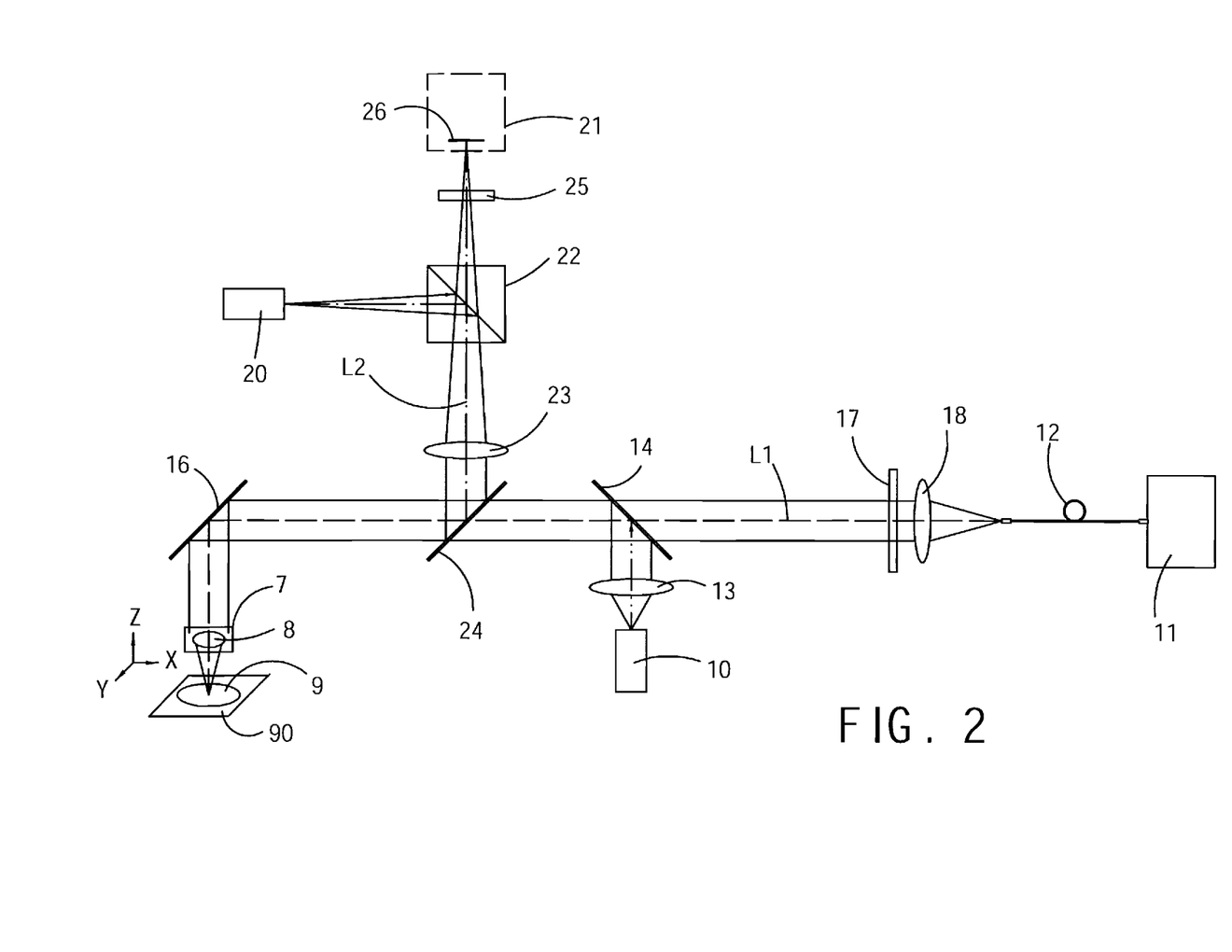
FIG. 2 shows architecture of a fluorescence microscopy imaging system according to another embodiment.

In an embodiment as shown in FIG. 1, the fluorescence detector 11 receives the fluorescence signal excited after the excitation light beam focuses on the sample 9 through the objective 8. In an embodiment as shown in FIG. 2, an optical fiber 12 is used to receive the fluorescence signal excited after the excitation light beam focuses on the sample 9 through the objective 8, and then guides the fluorescence signal into the fluorescence detector 11. Since the optical fiber 12 has different kinds of core diameter such as 50 μm or 100 μm, the capability of resolving the optical section can be increased by adjusting the core diameter. The fluorescence detector 11 may be a photomultiplier tube (PMT), for converting the received fluorescence signal into a current signal for numerical analysis by a computer.

Figure 3A:
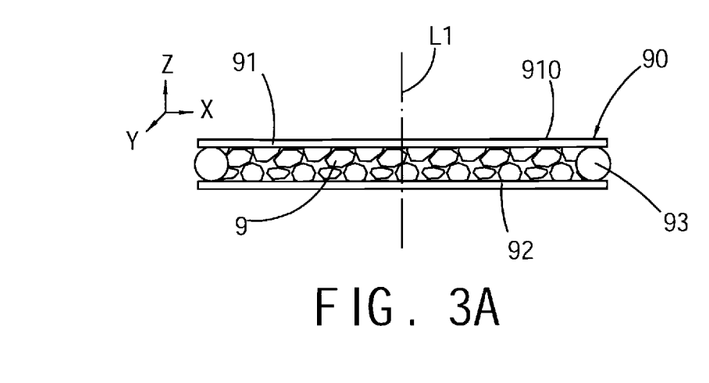
FIG. 3A is an embodiment of a servo light beam reflecting film, and shows that the servo light beam reflecting film is disposed on an upper surface of a cover glass covering the sample.
Figure 3B:
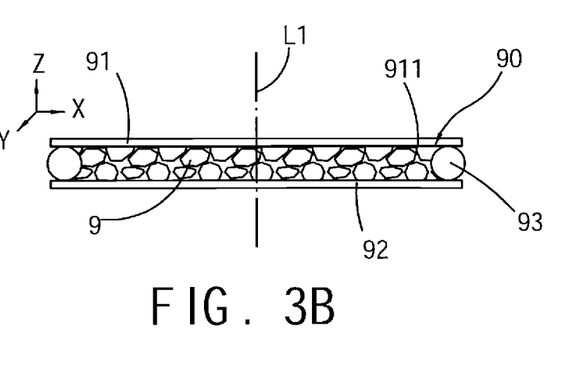
FIG. 3B is another embodiment of a servo light beam reflecting film, and shows that the servo light beam reflecting film is disposed on a lower surface of a cover glass covering the sample.
Figure 3C:
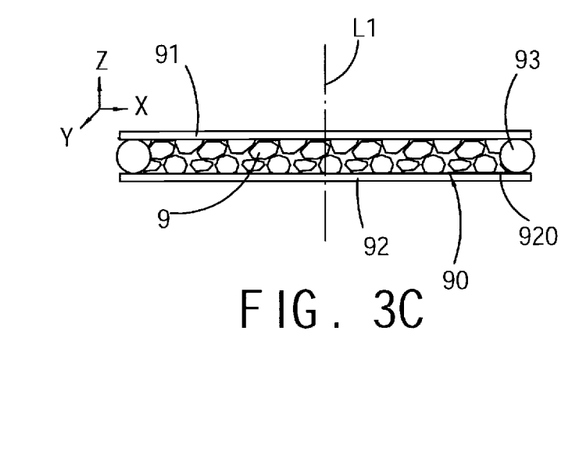
FIG. 3C is an embodiment of a servo light beam reflecting film, and shows that the servo light beam reflecting film is disposed on an upper surface of a slide glass carrying the sample.

According to an embodiment, the observation plane is a cross section at a location of intersection of the light path L1 and the sample 9. The servo light beam reflecting film 90 is disposed at a light transmissible element located on the observation plane, such that the servo light beam reflecting film 90 reflects the servo light beam without affecting the observation of the excited fluorescence signal of the sample 9. According to an embodiment, the servo light beam reflecting film 90 is disposed on an upper surface 910 of a cover glass 91 covering the sample (see FIG. 3A), a lower surface 911 of a cover glass 91 covering the sample (see FIG. 3B), or an upper surface 920 of a slide glass 92 carrying the sample (see FIG. 3C).

Figure 4A:
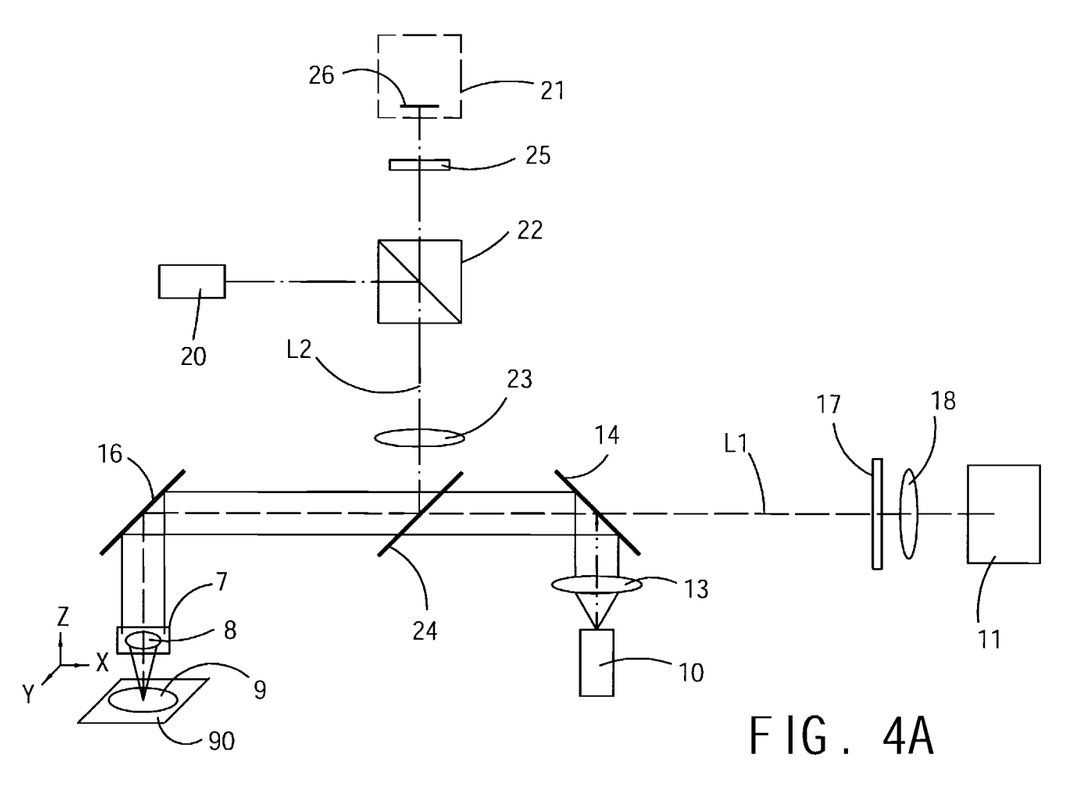
FIGS. 4A and 4B show architecture of a light path of fluorescence detection of a fluorescence microscopy imaging system according to an embodiment.
Figure 4B:
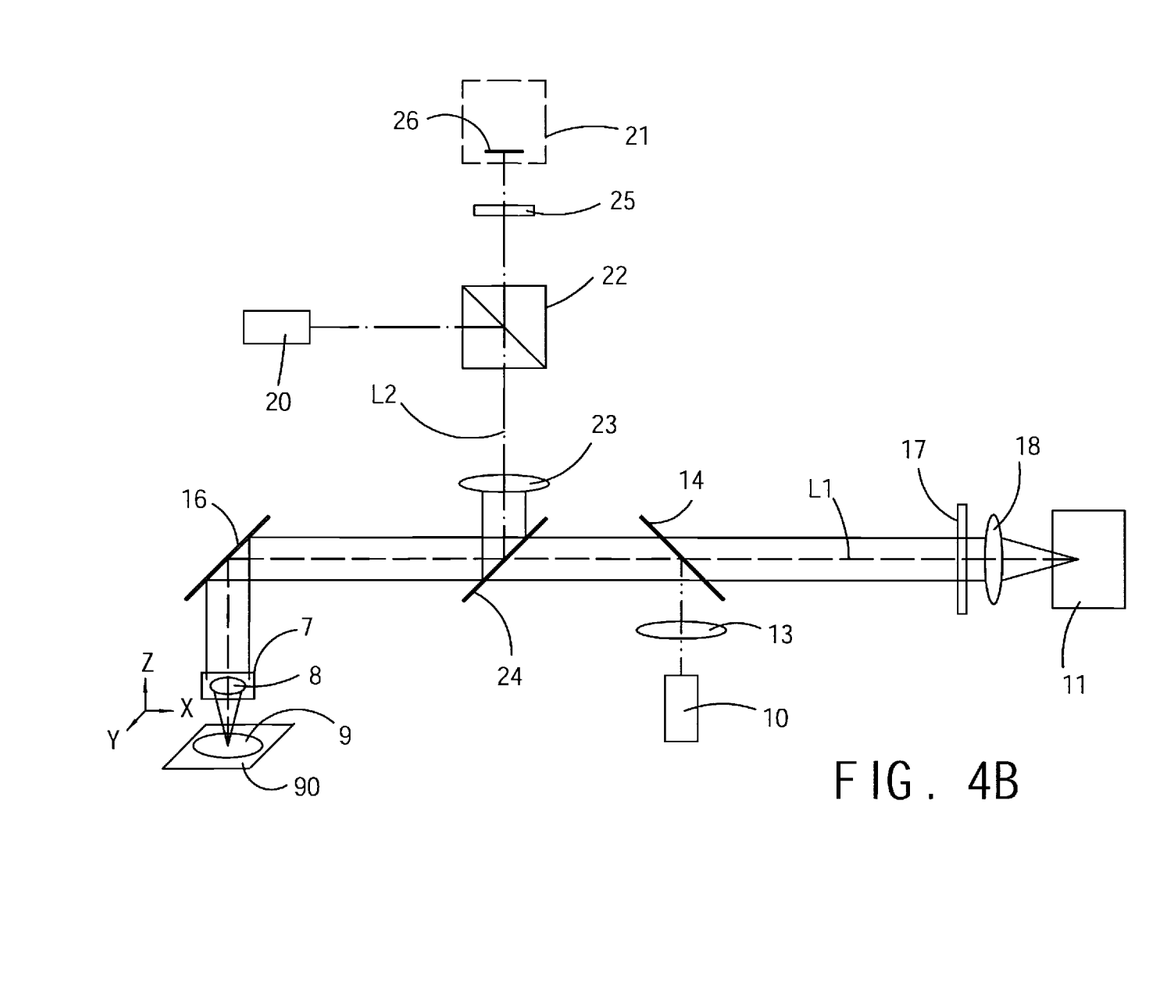

An embodiment of the optical assemble module of fluorescence detection M1 is formed by a plurality of optical elements, and the optical elements comprise: a collimating lens 13, a dichroic optical element 14, a reflecting mirror 16, the objective 8, a fluorescence filter 17 and an optical element 18. As shown in FIG. 4A, the collimating lens 13 converts the fluorescence excitation light beam into a parallel light beam, the fluorescence excitation light beam is reflected by the dichroic optical element 14, passes through the dichroic optical element 24, and then the fluorescence excitation light beam is reflected by the reflecting mirror 16 to pass through the objective 8, and the objective 8 is used to focus the excitation light beam on the position to be tested of the sample 9 to excite the sample 9 to emit fluorescence. The objective 8 is installed on the actuator 7, and the actuator 7 is used to move the objective 8 for focusing. As shown in FIG. 4B, the excited fluorescence passes through the objective 8 along the light path L1 in a reverse direction, and is then reflected by the reflecting mirror 16 to pass through the dichroic optical element 24 (the dichroic optical element 24 reflects the servo light beam, but allows the fluorescence excitation light beam and the fluorescence signal to penetrate) and the dichroic optical element 14 (the dichroic optical element 14 reflects the fluorescence excitation light beam, but allows the fluorescence signal to penetrate) and the fluorescence filter 17, and focuses on the fluorescence detector 11 through the optical element 18 (which is a condensing lens), and the fluorescence detector 11 is used to read the fluorescence signal of the sample 9. The fluorescence filter 17 may be a suitable fluorescence filter 17 selected according to a biological dye used.

Figure 5A:
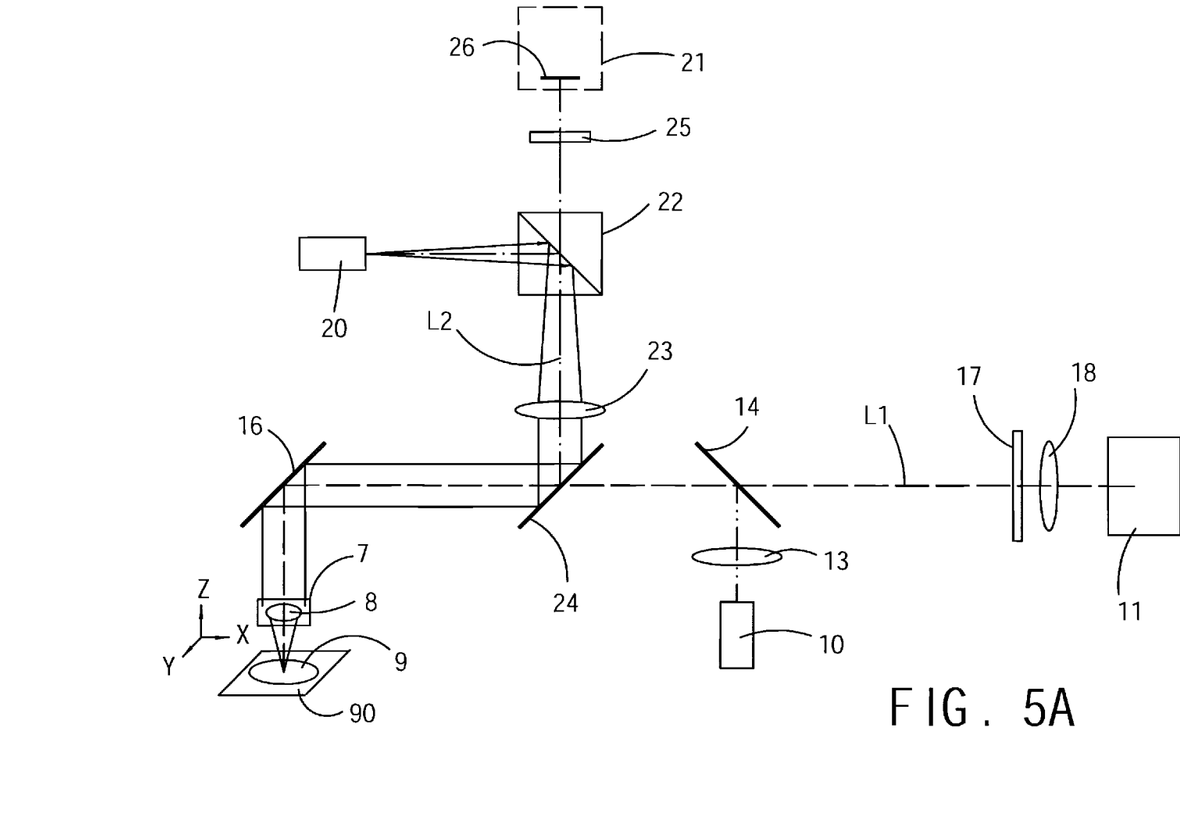
FIGS. 5A and 5B show architecture of a servo light path of a fluorescence microscopy imaging system according to an embodiment.
Figure 5B:
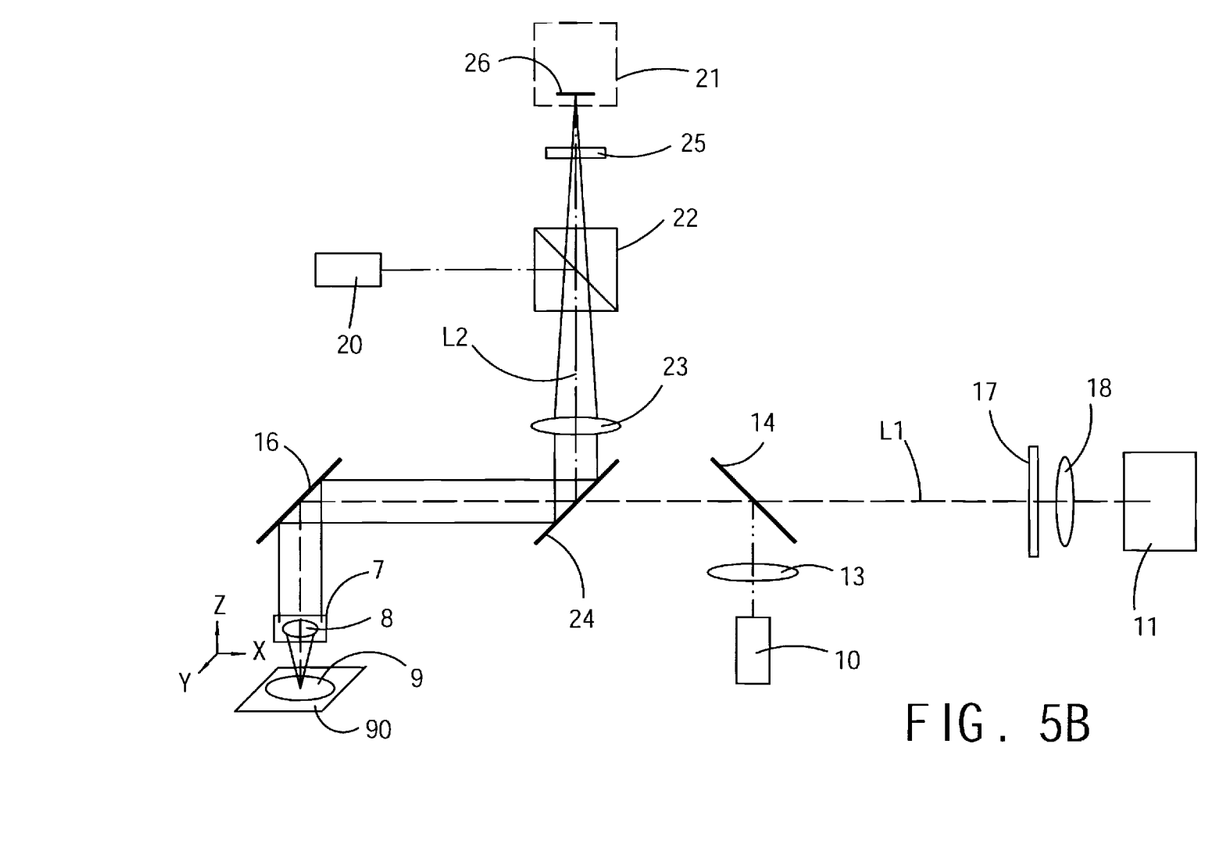

An embodiment of the optical assemble module of servo focus M2 is formed by a plurality of optical elements, and the optical elements comprise: a beam splitter 22, a collimating lens 23, and a cylindrical lens 25. The beam splitter 22 may be a polarization beam splitter or an ordinary beam splitter. As shown in FIG. 5A, the beam splitter 22 reflects the servo light beam having the second wavelength emitted by the servo light source generator 20 to pass through the collimating lens 23, and then the servo light beam is reflected to the reflecting mirror 16 of the optical assemble module of fluorescence detection M1 by the dichroic optical element 24 (at this time, the servo light beam has been coupled into the light path L1), is reflected by the reflecting mirror 16 to pass through the objective 8, and then focuses on the servo light beam reflecting film 90. As shown in FIG. 5B, the servo light beam reflected back by the servo light beam reflecting film 90 (referred to as a return beam) firstly passes through the objective 8 and reaches the reflecting mirror 16, and is then reflected to the dichroic optical element 24 by the reflecting mirror 16, reflected by the dichroic optical element 24, and sequentially passes through the collimating lens 23, the beam splitter 22 and the cylindrical lens 25. Afterward, the return beam is imaged on the focusing detection device 21, and the focusing detection device 21 analyzes the return beam signal, and then controls the actuator 7 for focusing according to an analytical result of the return beam signal.

According to an embodiment, an embodiment of the focusing detection device 21 uses a photo detector integrated circuit (PDIC) 26 to detect the return beam signal, and uses a focusing servo control circuit 30 (see FIG. 6) to analyze the return beam signal using a focusing detection method generally applied in an optical pickup head of an optical disk drive, for example, a knife-edge method, an astigmatic method or a spot sharp method, and to control the actuator 7 to move the objective 8 for focusing.

According to an embodiment, the actuator 7 is a uniaxial actuator, which is only capable of moving along a Z axis (optical axis), is used for carrying the objective 8 and driving the objective 8 to move along an optical axis of the light path L1, and cooperating with the focusing detection device 21 to control a focal point of the objective 8. According to another embodiment of the present invention, the actuator 7 is a uniaxial actuator 7, which is capable of moving along a Z axis for focusing, cooperates with a scanning movement stage to move along X-Y axes to drive the sample and a carrier thereof (including the cover glass 91, the slide glass 92 and a sample thickness support column 93, see FIG. 3A) to move (in which the X-Y plane is parallel to the observation plane), and performs planar scanning on the sample 9, so as to outline an appearance of the sample (for example, an appearance of a cell).

According to another embodiment, the actuator 7 is a triaxial actuator, which is capable of moving along a Z axis, an X axis and a Y axis (in which the X-Y plane is parallel to the observation plane), and is used for moving the objective 8 for focusing, performing planar scanning on the sample 9, and generating a planar image of the sample 9 by reading the fluorescence signal of the sample 9. The triaxial actuator 7 may be a piezoelectric actuator, a voice coil motor (VCM) actuator, or various other actuators, or a combination of different forms of actuators. An embodiment combines a uniaxial VCM actuator for X-axis actuation, a uniaxial piezoelectric actuator for Z-axis actuation, and a uniaxial piezoelectric actuator for Y-axis actuation.

According to an embodiment, the objective 8 is a high numerical aperture (NA=0.65) objective 8, and a diameter of the excitation light beam is greater than an effective diameter of the objective 8, such that when the actuator 7 scans along the XY axes and undergoes a micro-displacement, the entire effective diameter can be covered, and a desirable light spot can be obtained to excite the sample 9 to emit fluorescence. Since the fluorescence excitation light beam and the servo light beam have different focal positions due to different wavelengths, known data of the high numerical aperture objective 8 can be used to calculate relative positions thereof. An example is given below for illustrating a method for calculating the relative positions.

Since the wavelength is a function $n(\lambda)$ of the medium, the variation of the n value is influenced when the wavelength is changed, thus resulting in slight difference in the focal position.

The triple-wavelength light path system according to the embodiment may use an aspherical lens as the objective 8, use a 0.22 mm thick cover glass 91 made of pyrex glass, and use 0.04 mm-deep sea water as the sample 9 to simulate a tissue fluid in cytoplasm.

In simulation, a servo light beam having a wavelength of 780 nm, an optical fiber excitation light beam having a wavelength of 473 nm and an L.D. excitation light beam having a wavelength of 407 nm are respectively set, and optical distance simulation is performed by focusing. The preset three light beams are incident on the objective 8. Since the cover glass 91 and the sample 9 have a fixed thickness, the difference in optical distances of the three light beams after passing through the objective 8 mainly lies in a distance between the objective 8 and the cover glass 91. It can be obtained from the simulation result that a distance of the servo light beam having the wavelength of 780 nm from the objective 8 to the cover glass 91 is 2.316 mm; an optical distance of the optical fiber excitation light beam having the wavelength of 473 nm is 2.194 mm; and an optical distance of the L.D. excitation light beam having the wavelength of 407 nm is 2.125 mm. Therefore, a total distance of the optical fiber excitation light beam having the wavelength of 473 nm from the objective to the focal point is 2.194+0.22+0.04=2.454 mm; a total distance of the L.D. excitation light beam having the wavelength of 407 nm from the objective to the focal point is 2.125+0.22+0.04=2.385 mm; and a total distance of the servo light beam having the wavelength of 780 nm from the objective to the focal point is 2.316+0.22+0.04=2.576 mm. Therefore, the relative positions of the fluorescence excitation light beam and the servo light beam can be calculated, and further, the focusing servo control circuit 30 is used to adjust Z-axis positions of the fluorescence excitation light beam and the servo light beam, so as to achieve image scanning of the sample 9 at different Z-axis positions.

Figure 6:
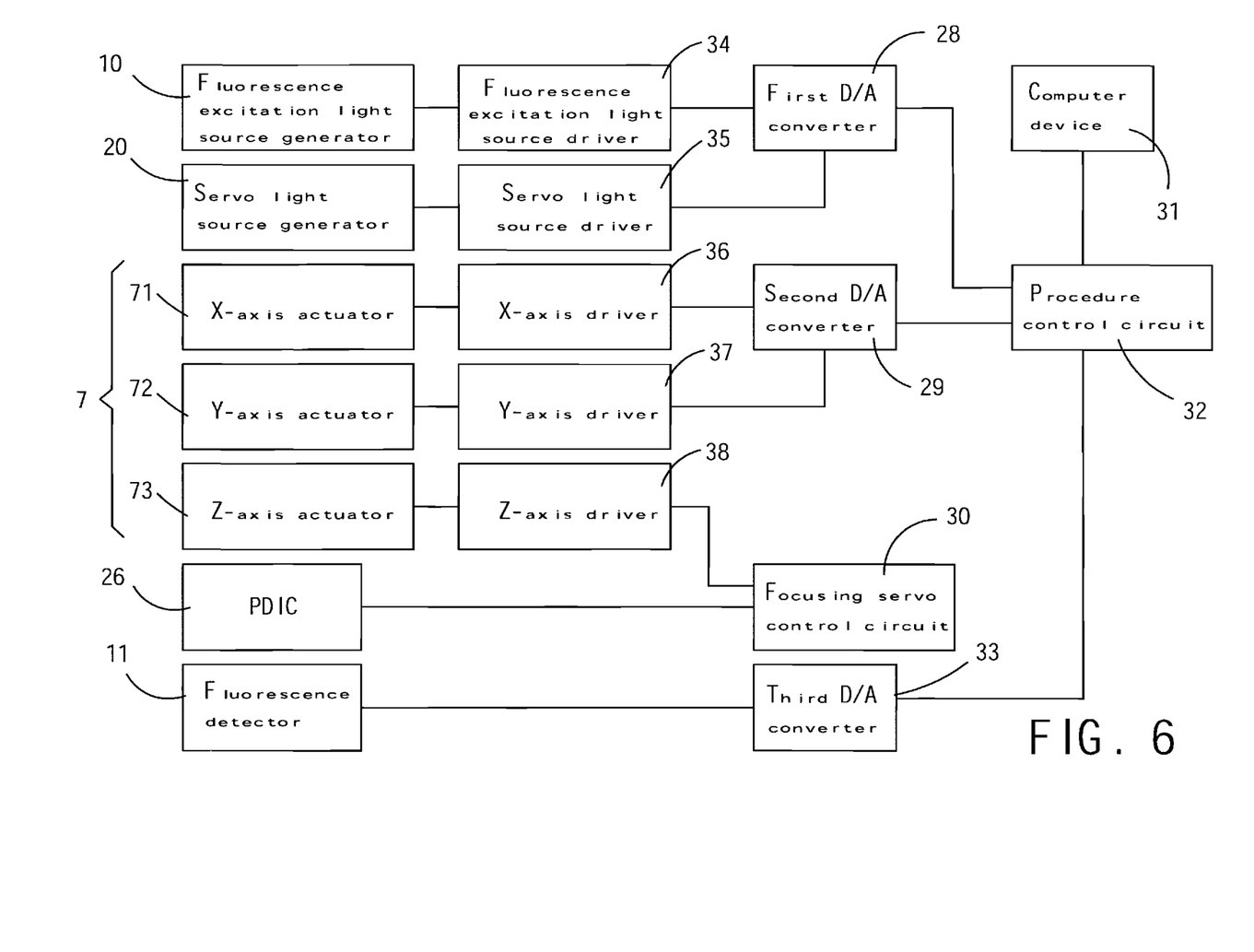
FIG. 6 is a illustrate diagram for a servo control system using a triaxial actuator to perform planar scanning on the sample according to an embodiment.

According to an embodiment, an architecture of a servo control system using the triaxial actuator 7 to perform planar scanning on the sample 9, as shown in FIG. 6, comprises: a procedure control circuit 32, a fluorescence excitation light source driver 34 for driving the fluorescence excitation light source generator 10, a servo light source driver 35 for driving the servo light source generator 20, a first digital/analog (D/A) converter 28, a second D/A converter 29, an X-axis driver 36 for driving an X-axis actuator 71 of the triaxial actuator 7 to move, a Y-axis driver 37 for driving a Y-axis actuator 72 of the triaxial actuator 7 to move, and a Z-axis driver 38 for driving a Z-axis actuator 73 of the triaxial actuator 7 to move. The procedure control circuit 32 communicates with a computer device 31 (may be a personal computer or notebook computer) through, for example, a universal serial bus (USB) interface, and communicates with the first D/A converter 28 through a communication interface. An analog output signal of the first D/A converter 28 is used to adjust magnitudes of output driving currents of the fluorescence excitation light source driver 34 and the servo light source driver 35, so as to adjust switch signals of the fluorescence excitation light source generator 10 and the servo light source generator 20, thereby achieving, for example, a laser excitation signal having a resolution of 512 pixel×512 pixel. Then, a third D/A converter 33 is used to transmit the fluorescence signal read by the fluorescence detector 11 to the computer device 31 through the procedure control circuit 32, so as to outline a shape of the sample 9.

To sum up, the present disclosure uses the servo light beam reflecting film 90 and the servo light beam having the corresponding wavelength for focusing control to replace the conventional design of the fluorescence microscope using an eyepiece for focusing. Moreover, in the present disclosure, the wavelength of the servo light beam does not overlap that of the excitation light beam. The module for focusing control can control the objective 8 to correctly focus on the position to be tested of the sample 9, further use the excitation light beam to excite the sample 9 to generate the fluorescence signal, and then read the fluorescence signal. Furthermore, the present disclosure can further use the actuator 7 for focusing and performing planar scanning on the sample 9. The entire fluorescence microscopy imaging system can further be integrated in an optical bearer by modularization, so as to achieve an easy-to-carry effect.

What is claimed is:

1. A fluorescence microscopy imaging system, for detecting a fluorescence signal of a sample, comprising:
   a module for detecting fluorescence, having a fluorescence excitation light source generator, an optical assemble module of fluorescence detection, and a fluorescence detector, wherein the fluorescence excitation light source generator is capable of generating an excitation light beam having a first wavelength, the excitation light beam is guided by the optical assemble module of fluorescence detection along a light path to pass through an objective and focused on the sample so as to excite the sample to emit fluorescence light, and then the excited fluorescence light of the sample is guided by the optical assemble module of fluorescence detection along the light path to the fluorescence detector; and
   a module for focusing control, having a servo light source generator, a dichroic optical element, an optical assemble module of servo focus, an actuator, a servo light beam reflecting film, and a focusing detection device; wherein the servo light source generator is capable of generating a servo light beam having a second wavelength, the servo light beam reflecting film is disposed on an observation plane of the sample, the dichroic optical element is disposed at an area of intersection of the optical assemble module of servo focus and the light path, and is used to couple the servo light beam to the light path, such that the servo light beam to pass through the objective and reach the servo light beam reflecting film, and then guides a return beam signal reflected back from the servo light beam reflecting film along a servo light path to the focusing detection device, the focusing detection device controls the actuator to move along an optical axis of the light path according to the return beam, and the actuator is used to move the objective for focusing.

2. The fluorescence microscopy imaging system according to claim 1, wherein the servo light beam is a light beam having a wavelength of 780 nm or above.

3. The fluorescence microscopy imaging system according to claim 1, wherein the fluorescence excitation light beam is an optical fiber light source having a wavelength of 473 nm or a laser diode (L.D.) light source having a wavelength of 405 nm.

4. The fluorescence microscopy imaging system according to claim 1, wherein the fluorescence detector is a photomultiplier tube (PMT).

5. The fluorescence microscopy imaging system according to claim 1, wherein the objective is a high numerical aperture objective, and a diameter of the excitation light beam is greater than an effective diameter of the high numerical aperture objective.

6. The fluorescence microscopy imaging system according to claim 1, wherein the observation plane is a cross section at a location of intersection of the light path and the sample, and the servo light beam reflecting film is disposed at a light transmissible element located on the observation plane.

7. The fluorescence microscopy imaging system according to claim 1, wherein the actuator is a uniaxial piezoelectric actuator or a uniaxial voice coil motor (VCM) actuator.

8. The fluorescence microscopy imaging system according to claim 7, wherein the actuator is used for moving the objective for focusing.

9. The fluorescence microscopy imaging system according to claim 8, further comprising a scanning movement stage, capable of moving along X-Y axes to drive the sample and a carrier thereof.

10. The fluorescence microscopy imaging system according to claim 1, wherein the actuator is a triaxial actuator comprising an X-axis actuator, a Y-axis actuator and a Z-axis actuator, and one of the X-axis actuator, the Y-axis actuator and the Z-axis actuator is a uniaxial piezoelectric actuator or a uniaxial VCM actuator.

11. The fluorescence microscopy imaging system according to claim 9, wherein the Z-axis actuator of the triaxial actuator is used for moving the objective for focusing, and the X-axis actuator and the Y-axis actuator are used for moving the objective to perform planar scanning on the sample.

12. The fluorescence microscopy imaging system according to claim 1, wherein the focusing detection device comprises a photo detector integrated circuit (PDIC) and a focusing servo control circuit, the PDIC is used for detecting the return beam signal, and the focusing servo control circuit analyzes the return beam signal using a focusing detection method, and is used for controlling the actuator to move the objective for focusing.

13. The fluorescence microscopy imaging system according to claim 12, wherein the focusing detection method is any one of a knife-edge method, an astigmatic method, and a spot sharp method.

14. A fluorescence microscopy imaging system, for detecting a fluorescence signal of a sample, comprising:
   a module for detecting fluorescence, having a fluorescence excitation light source generator, an optical assemble module of fluorescence detection, and a fluorescence detector, wherein the fluorescence excitation light source generator is capable of generating an excitation light beam having a first wavelength, the excitation light beam is guided by the optical assemble module of fluorescence detection along a light path to pass through an objective and focused on the sample so as to excite the sample to emit a fluorescence light, and then the excited fluorescence light of the sample is guided by the optical assemble module of fluorescence detection along the light path to the fluorescence detector;
   a module for focusing control, having a servo light source generator, a dichroic optical element, an optical assemble module of servo focus, an actuator, a servo light beam reflecting film, and a focusing detection device, wherein the servo light source generator is capable of generating a servo light beam having a second wavelength, the servo light beam reflecting film is disposed on an observation plane of the sample, the dichroic optical element is disposed at an area of intersection of the optical assemble module of servo focus and the light path, and is used to couple the servo light beam to the light path, such that the servo light beam passes through the objective and reaches the servo light beam reflecting film, and then guides a return beam signal reflected back from the servo light beam reflecting film along a servo light path to the focusing detection device, the focusing detection device controls the actuator to move along an optical axis of the light path according to the return beam, and the actuator is used to move the objective for focusing; and an optical fiber, for receiving the fluorescence light excited after the excitation light beam focuses on the sample through the objective, and then introducing the fluorescence light into the fluorescence detector.

15. The fluorescence microscopy imaging system according to claim 14, wherein the core diameter of the optical fiber is 50 μm or 100 μm.

16. A fluorescence microscopy imaging system, for detecting a fluorescence signal of a sample, comprising:

a module for detecting fluorescence, having a fluorescence excitation light source generator, an optical assemble module of fluorescence detection, and a fluorescence detector, wherein the fluorescence excitation light source generator is capable of generating an excitation light beam having a first wavelength, the excitation light beam is guided by the optical assemble module of fluorescence detection along a light path to pass through an objective and be focused on the sample so as to excite the sample to emit a fluorescence light, and then the excited fluorescence light of the sample is guided by the optical assemble module of fluorescence detection along the light path to the fluorescence detector; and a module for focusing control, having a servo light source generator, a dichroic optical element, an optical assemble module of servo focus, an actuator, a servo light beam reflecting film, and a focusing detection device, wherein the servo light source generator is capable of generating a servo light beam having a second wavelength, the servo light beam reflecting film is disposed on an observation plane of the sample, the dichroic optical element is disposed at an area of intersection of the optical assemble module of servo focus and the light path, and is used to couple the servo light beam to the light path, such that the servo light beam passes through the objective and reaches the servo light beam reflecting film, and then guides a return beam signal reflected back from the servo light beam reflecting film along a servo light path to the focusing detection device, the focusing detection device controls the actuator to move along an optical axis of the light path according to the return beam, and the actuator is used to move the objective for focusing;

wherein the observation plane is a cross section at a location of intersection of the light path and the sample, the servo light beam reflecting film is disposed at a light transmissible element located on the observation plane, the servo light beam reflecting film is disposed on any one of an upper surface of a cover glass covering the sample, a lower surface of a cover glass covers the sample, and an upper surface of a slide glass carries the sample.

* * * * *